May 20, 1941.  W. FLETT  2,242,246
MEAT TYING MACHINE
Original Filed Nov. 1, 1935  12 Sheets-Sheet 4

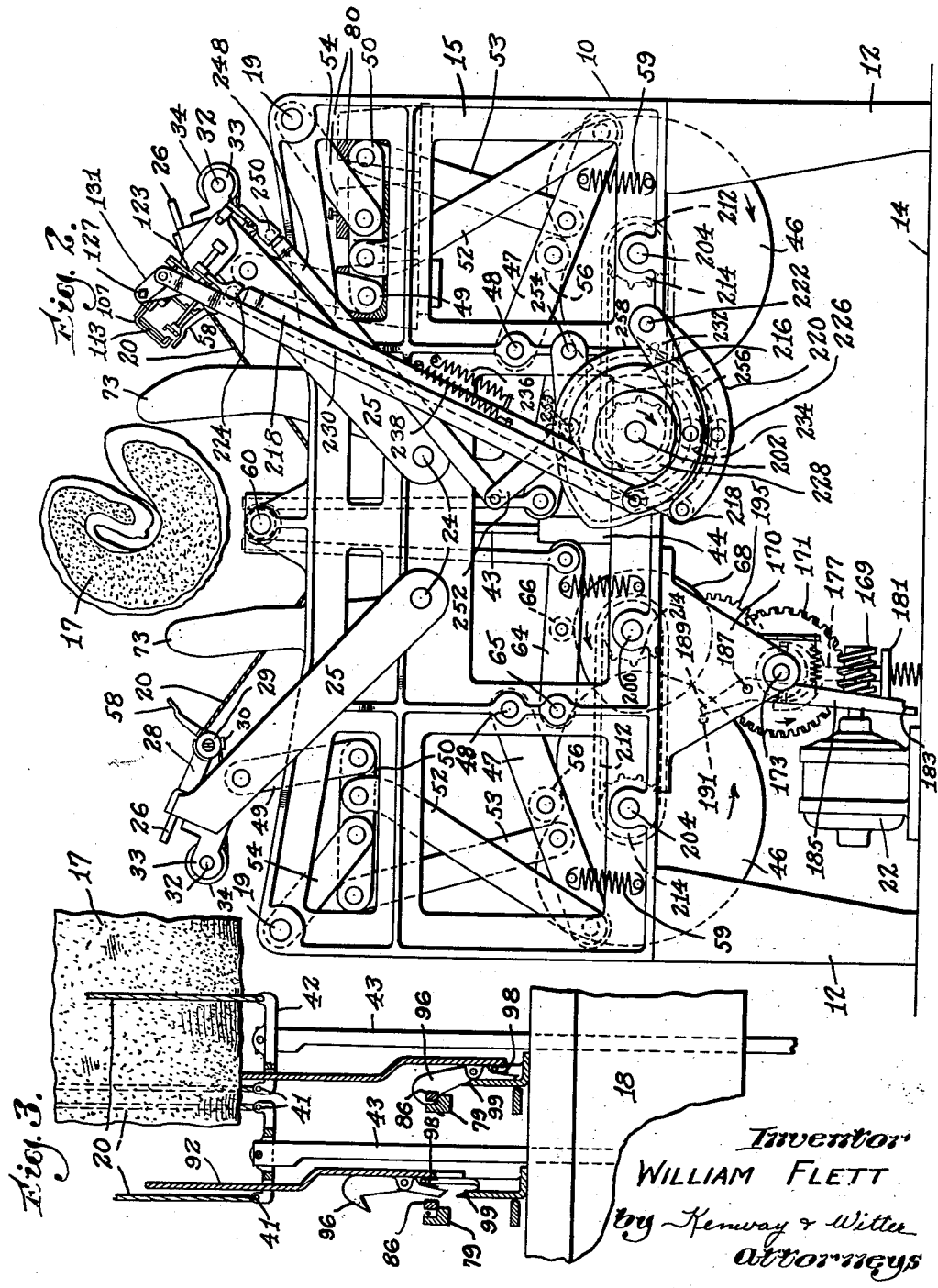

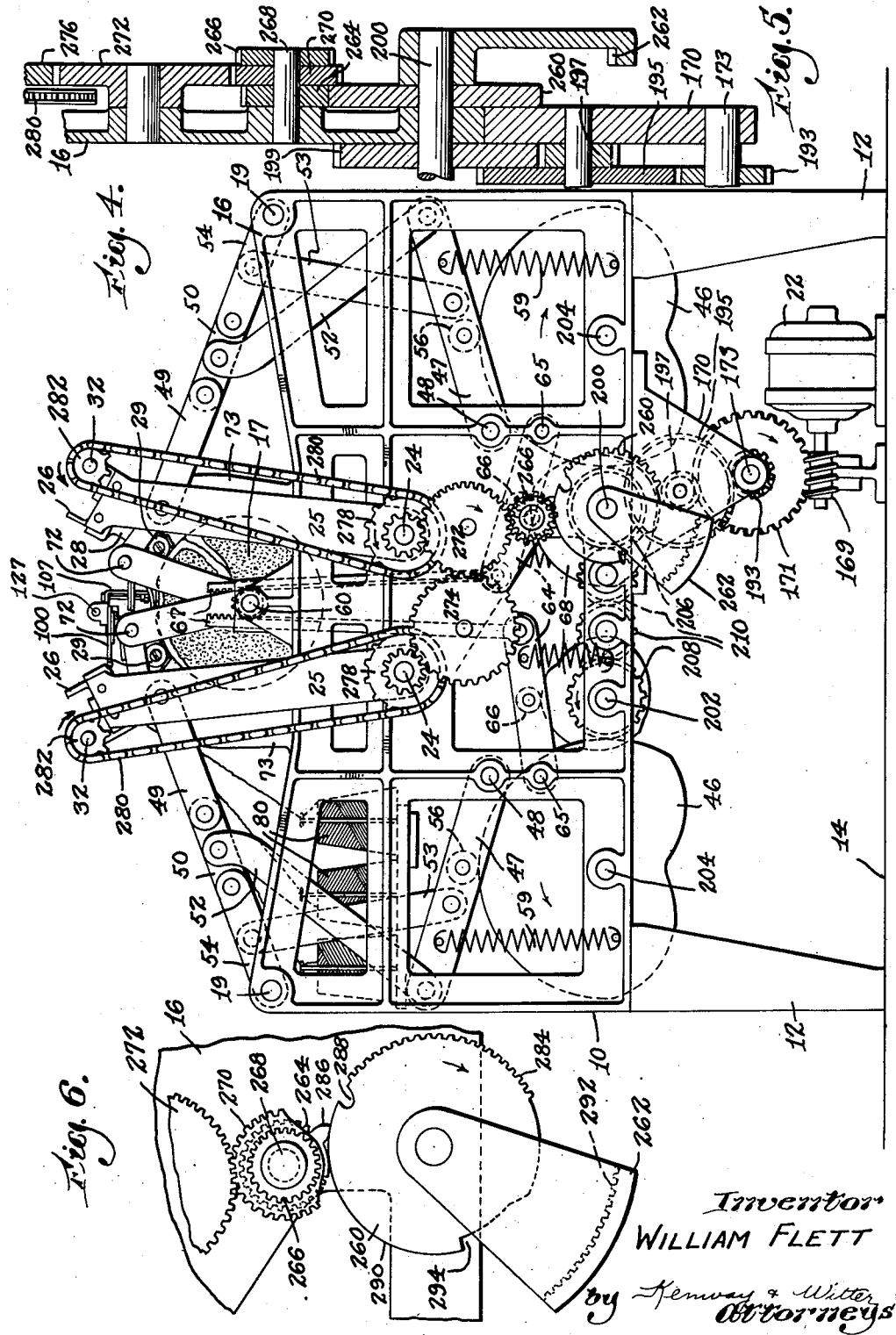

Inventor
WILLIAM FLETT
by Henway & Witter
Attorneys

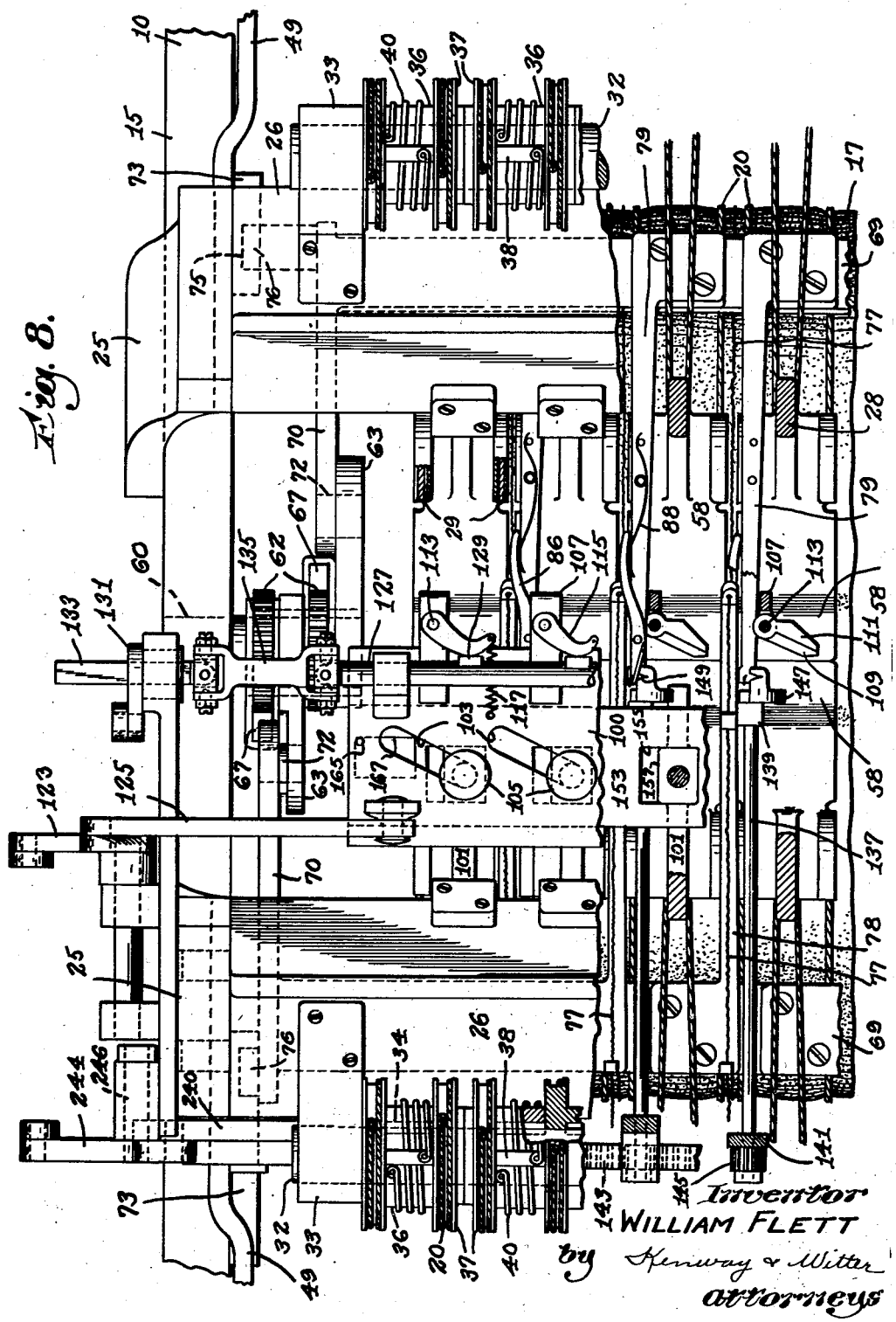

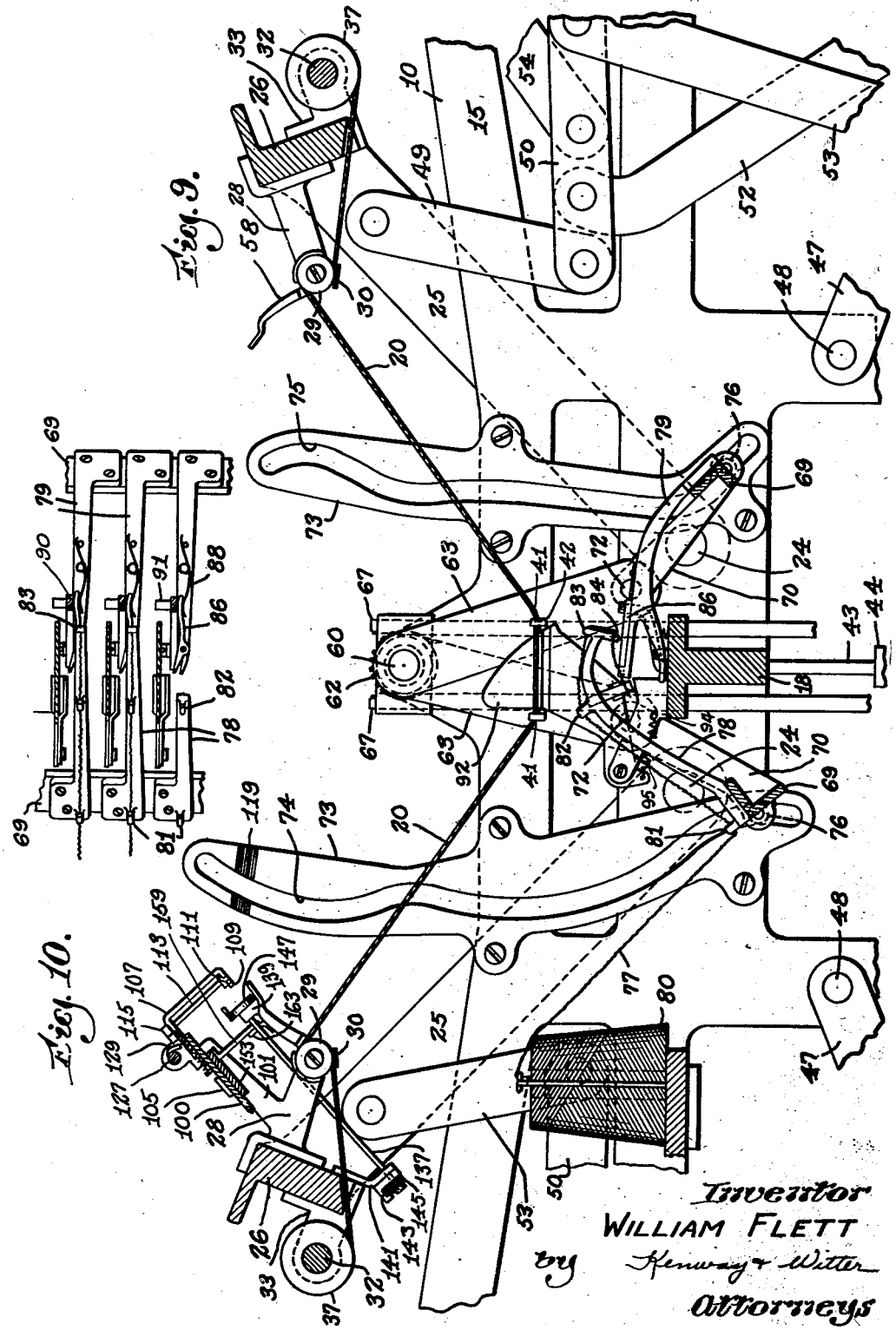

May 20, 1941.  W. FLETT  2,242,246
MEAT TYING MACHINE
Original Filed Nov. 1, 1935   12 Sheets-Sheet 7
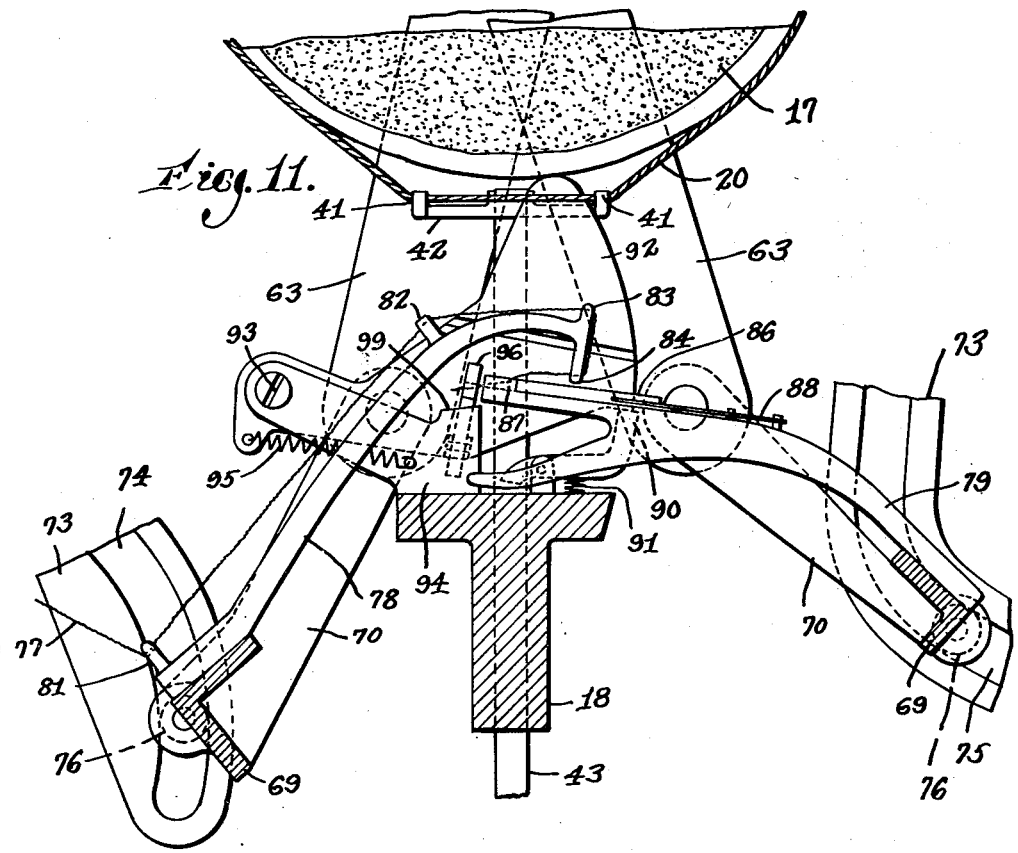
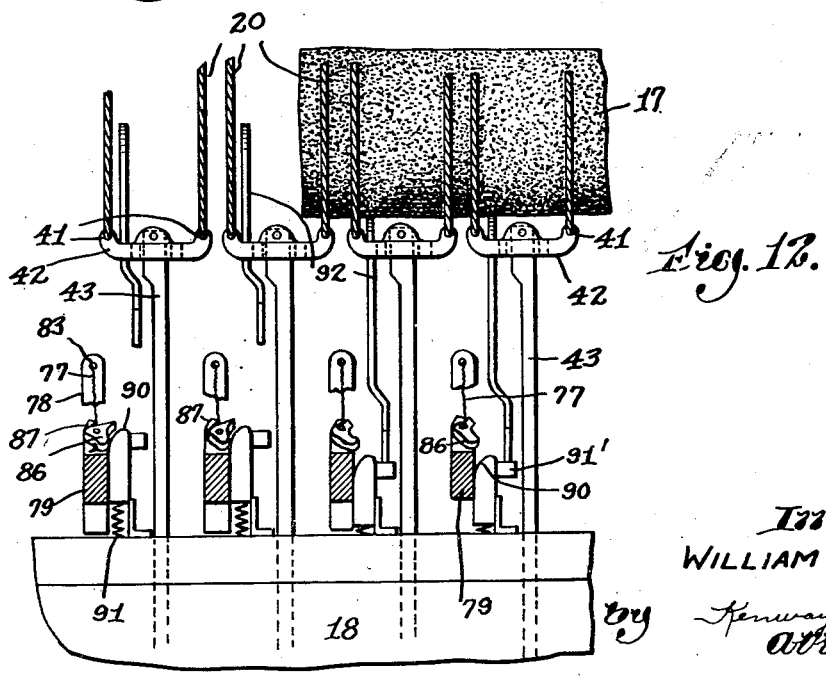
Inventor
WILLIAM FLETT
by Kenway & Witter
Attorneys

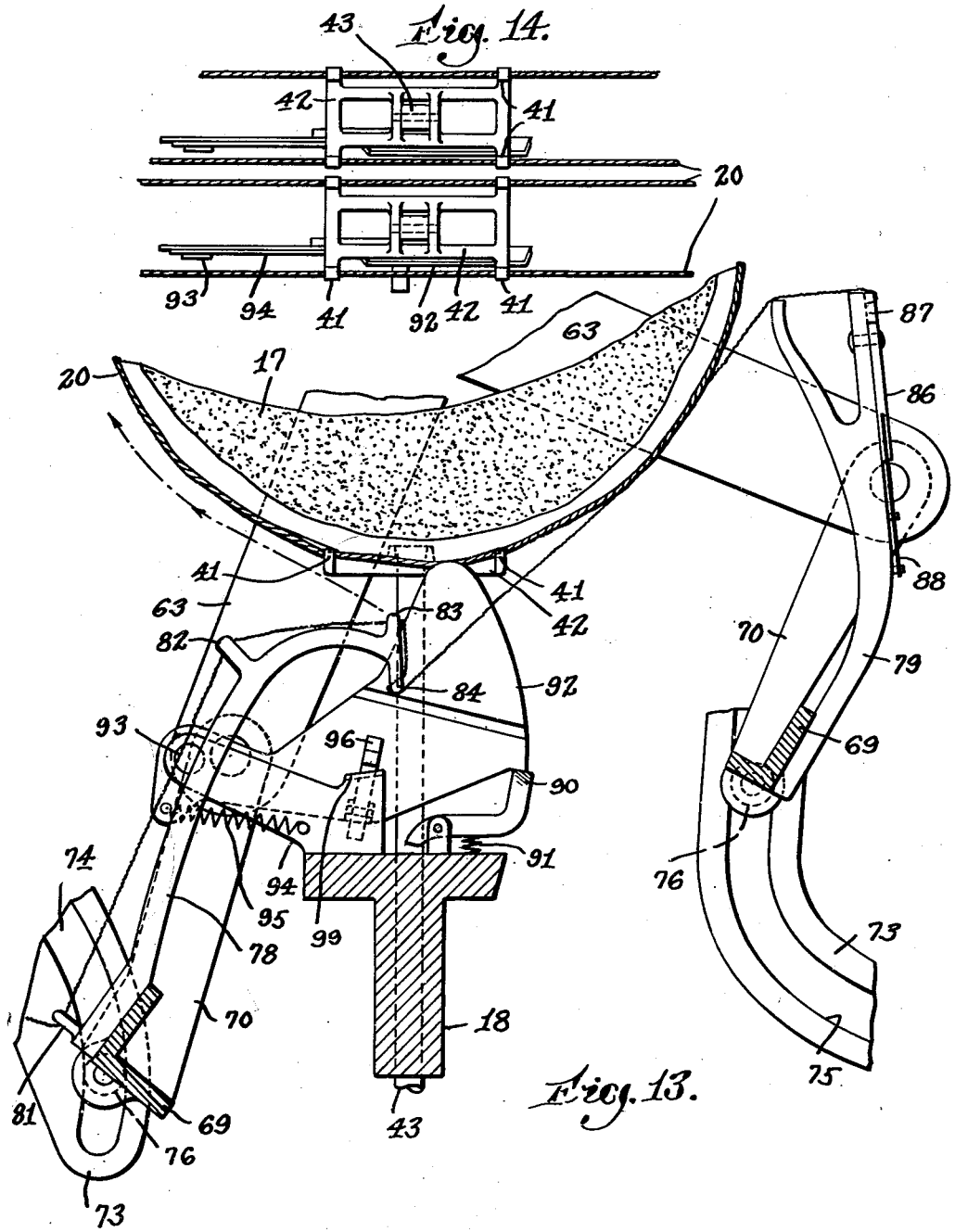

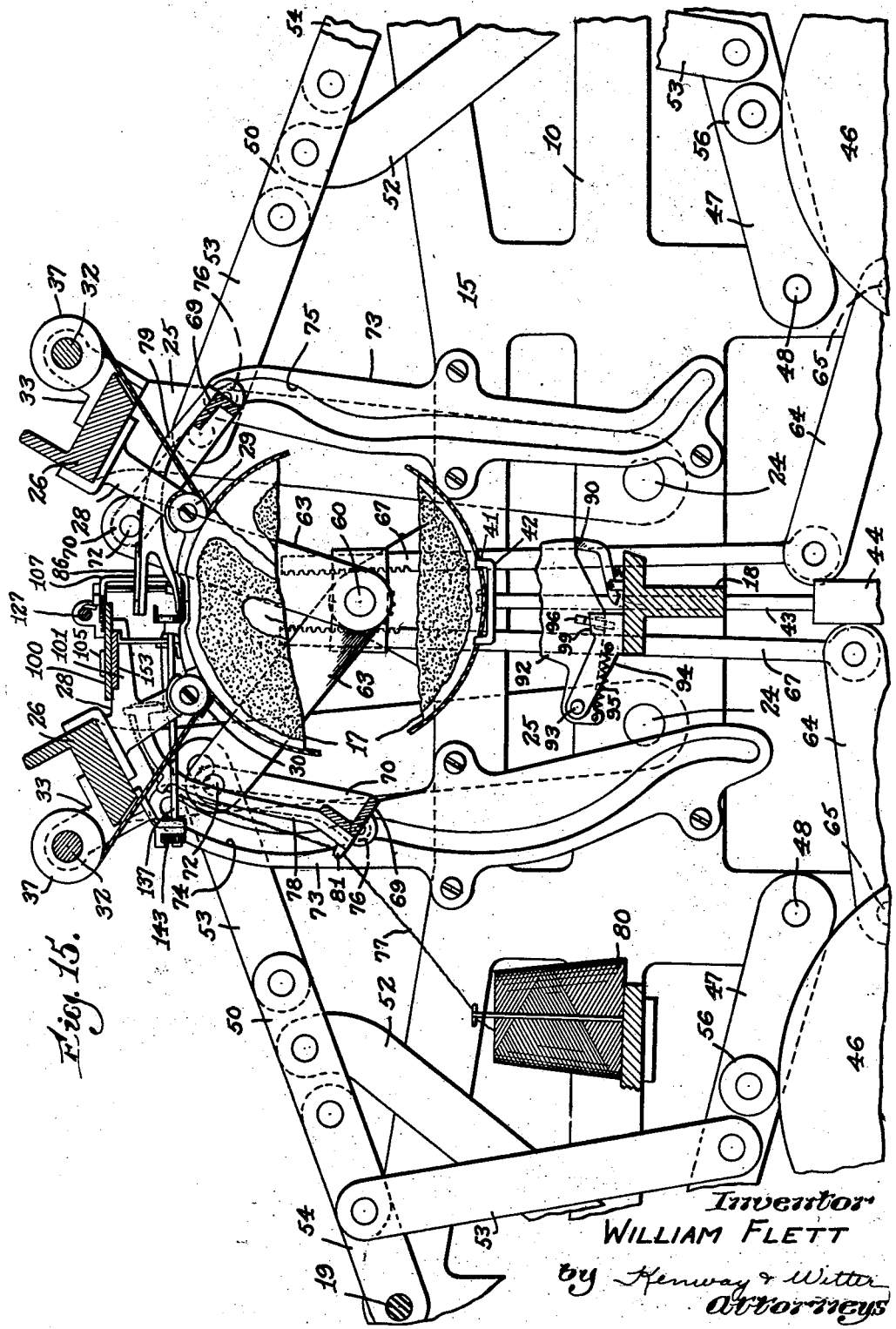

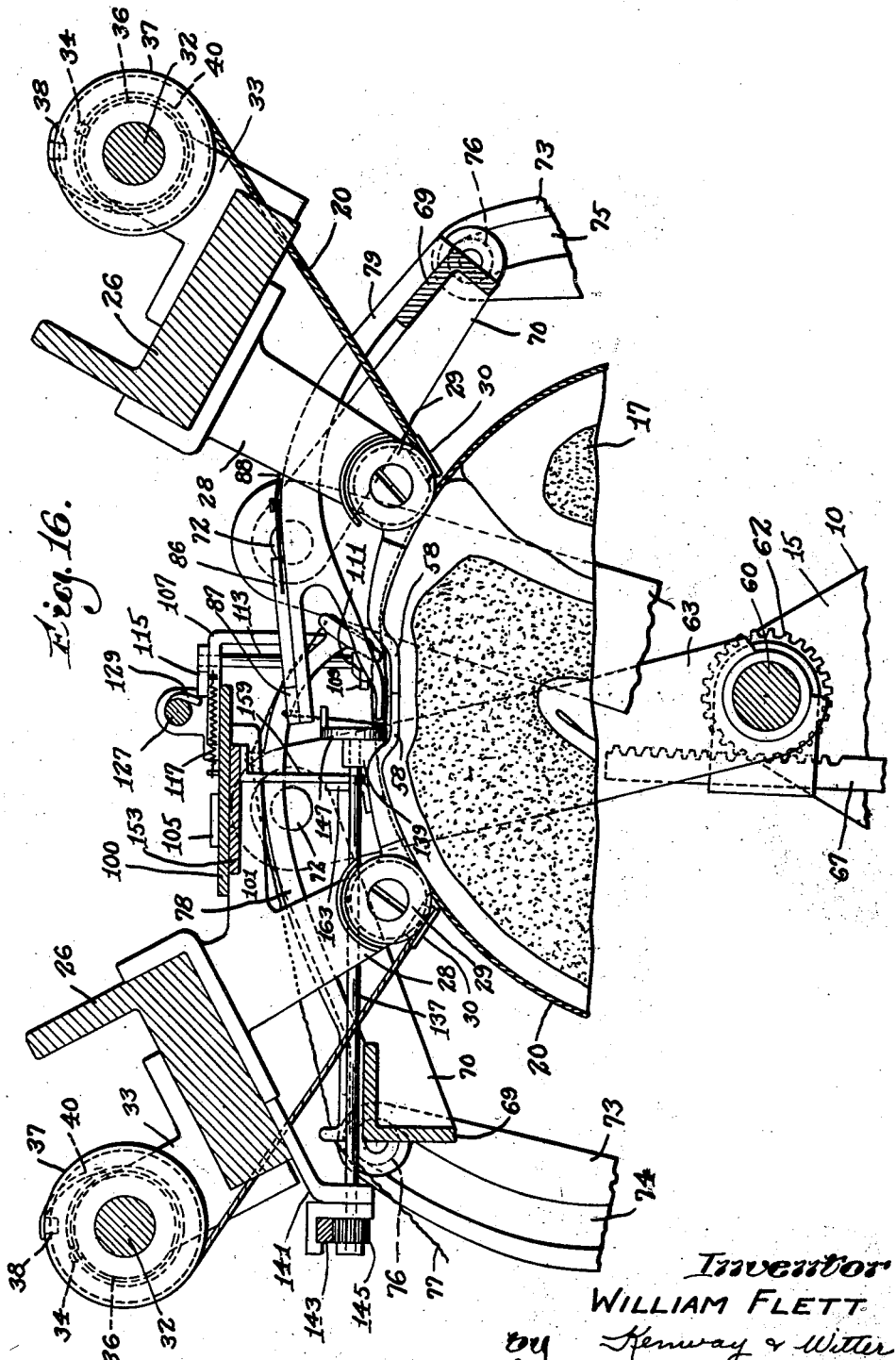

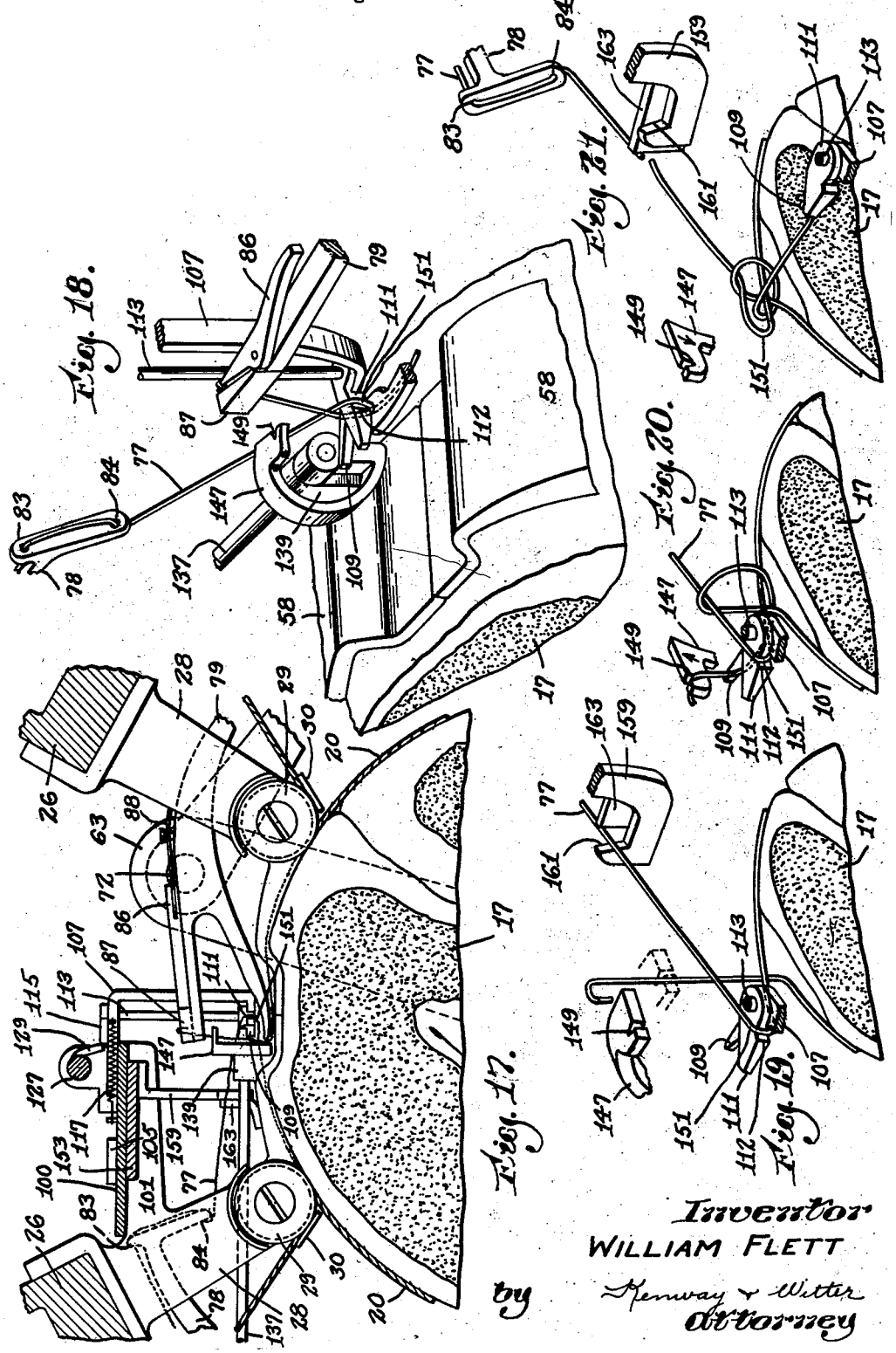

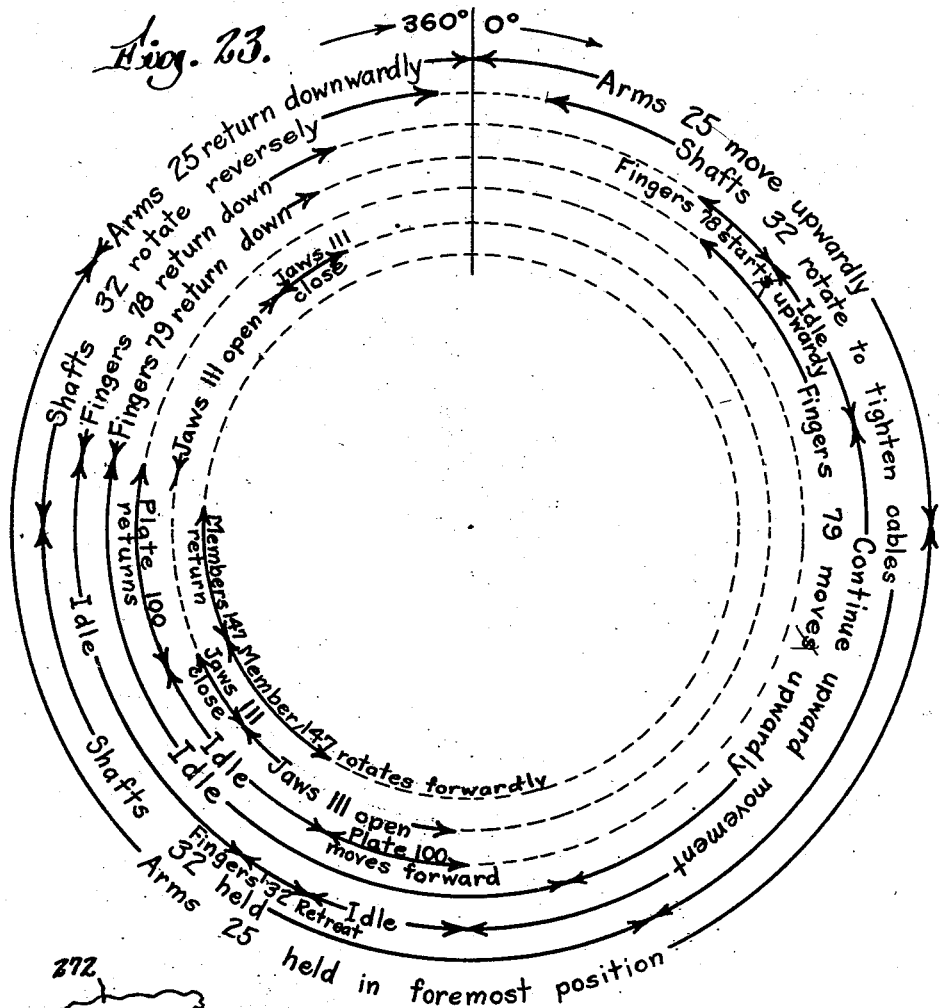
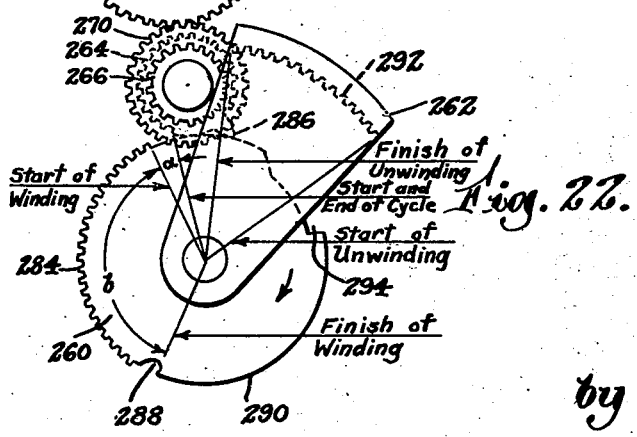

Patented May 20, 1941

2,242,246

UNITED STATES PATENT OFFICE 2,242,246

MEAT TYING MACHINE

William Flett, Melrose, Mass.

Application November 1, 1935, Serial No. 47,735
Renewed April 10, 1940

20 Claims. (Cl. 100—31)

This invention relates to tying or packaging machines and more particularly to a meat tying machine. Loose and somewhat flat pieces of meat are commonly rolled into compact form or parcels for roasting and like purposes and are held in this form by cords or twine wrapped therearound, the cords usually being independent and parallel strands relatively spaced along the parcel. It is a slow tedious task to wrap and tie these meat parcels by hand and it is the primary object of my invention to produce a new and substantially automatic machine for compressing and tying such parcels efficiently, rapidly and with great economy.

My invention contemplates the use of a plurality of cables for initially engaging the parcel therearound and compressing the same to a desired degree and, furthermore, twine holding, wrapping and tying mechanism for wrapping the compressed parcel with twine and tying the same in a manner holding it in the compressed condition. The mechanism is preferably automatic in operation, and includes various novel details, such as certain mechanism automatically tripped into operative position by the weight of the meat to be wrapped, means for automatically stopping the machine when it has completed the wrapping operation and returned to initial position, means whereby the wrapping and tying mechanism automatically adapts itself to operating only along the length of the parcel, it being understood that the parcels vary in length, novel knotting mechanisms, etc.

The form of my invention herein specifically disclosed embodies the use of a plurality of arms carrying the said cables for compressing the parcels. In performing the cable wrapping function it is necessary to give these arms a movement of considerable scope and one of the novel features of my invention resides in a compound linkage system for thus moving the arms from a relatively small and simple movement imparted by a cam or otherwise.

It should be noted that the machine is adapted to function through a definite cycle of operations and that a parcel is wrapped at each such cycle. It will be appreciated that through this cycle several independent operations, such as fully enclosing the product, compressing the enclosed product to a predetermined degree, wrapping suitable twine strands around the compressed product, joining the strand ends, and returning the parts to initial position ready for a succeeding cycle, must be performed in sequence. Another novel feature of the invention resides in mechanism adapted, upon rotation of an element through one revolution, to perform these operations in proper sequence, and including a novel mechanical movement for tightening the cables to compress the product.

These and other features of the invention will be best understood and appreciated from the following description of the drawings in which—

Fig. 2 is a front elevation thereof,

Fig. 3 is a fragmentary enlarged side elevation of certain details,

Fig. 4 is a rear elevation of the machine,

Fig. 5 is a fragmentary sectional view through the main driving train,

Figure 1:
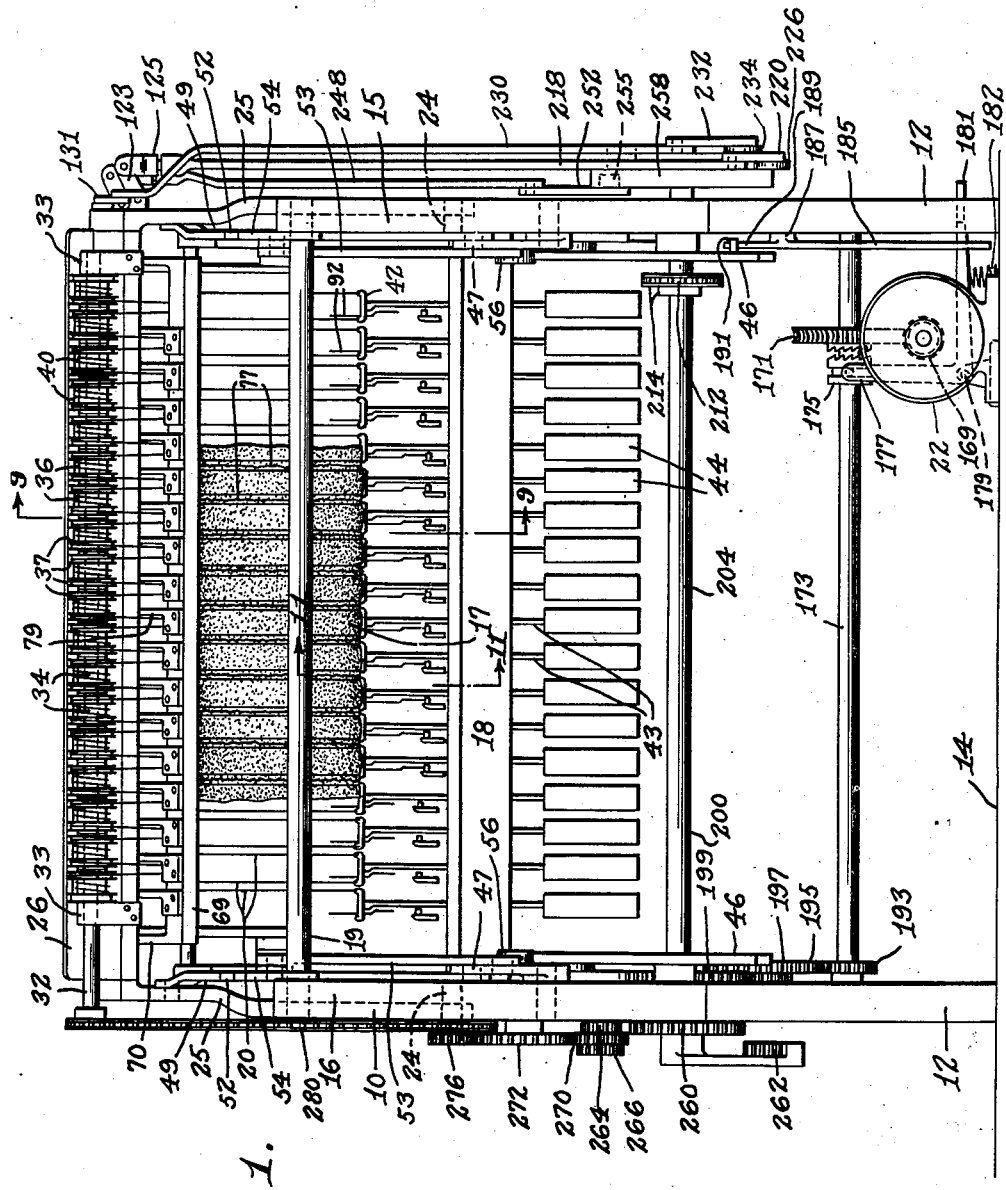
Fig. 1 is a side elevation of a machine embodying my invention.
Figure 7:
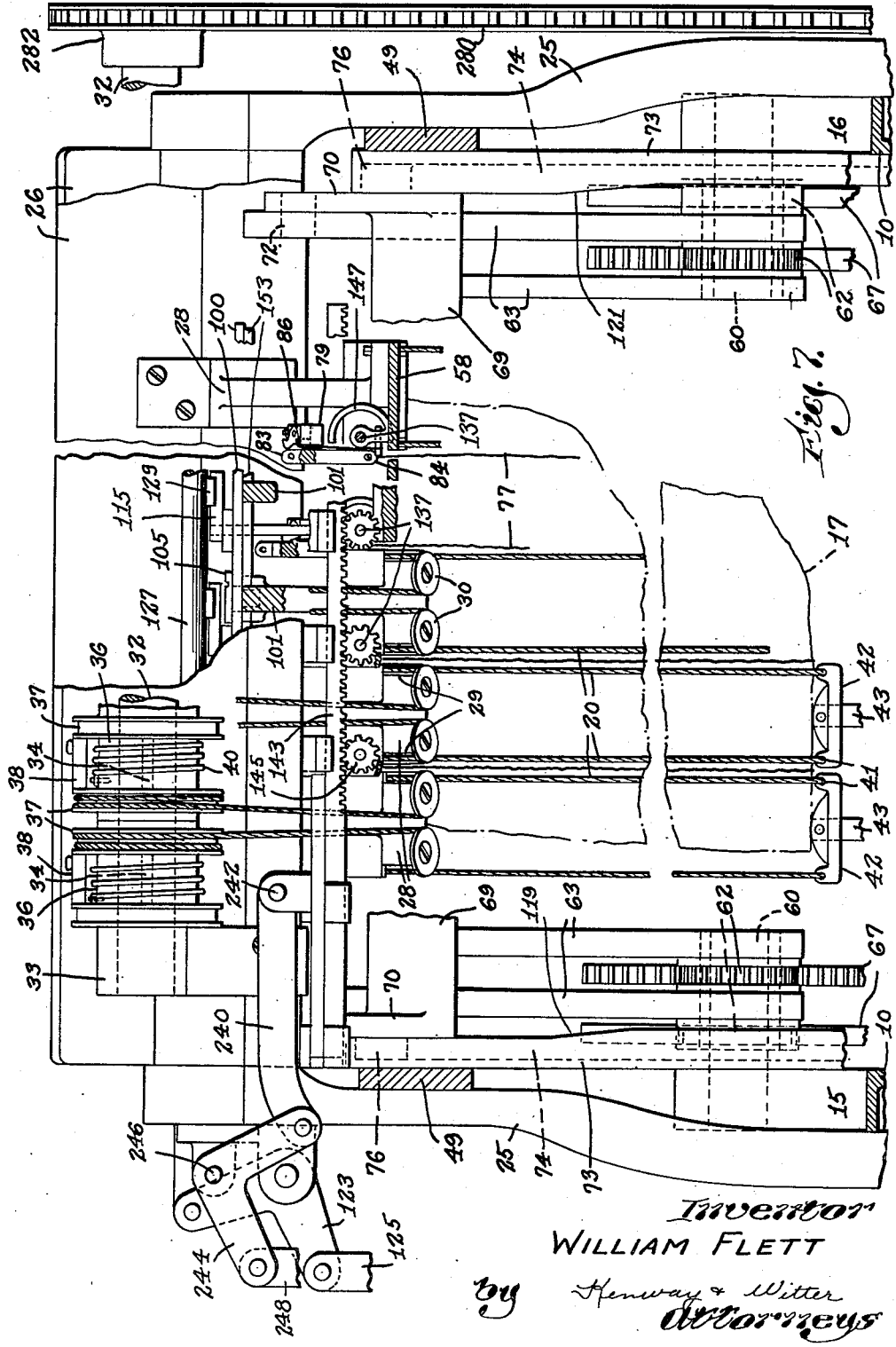

Fig. 6 is a fragmentary elevation of a novel mechanical movement employed in the machine, Fig. 7 is an enlarged fragmentary side elevation of the machine taken on the side opposite to Fig. 1, Fig. 8 is an enlarged fragmentary plan view of the machine, Fig. 9 is a fragmentary cross-sectional view, taken on the line 9—9 of Fig. 1, but showing the cable carrying arms in open position, Fig. 10 is a fragmentary plan view of a portion of Fig. 9, Fig. 11 is an enlarged sectional view of the twine carrying arms taken on line 11—11 of Fig. 1, but showing the twine carrying arms in their lowermost positions, Fig. 12 is a fragmentary side elevation of the cable holding and equalizing plates, Fig. 13 is a view corresponding to Fig. 11 but showing the parts in an advanced position, Fig. 14 is a fragmentary plan view of the cable holding the equalizing plates, Fig. 15 is a sectional view, taken on the line 9—9 of Fig. 1, and showing the cable and twine carrying arms in further advanced positions, Fig. 16 is an enlarged fragmentary view of a portion of Fig. 15, but showing the twine carrying arms at the end of their advancing movement, Fig. 17 is a like view showing various parts in a still further advanced position, Fig. 18 is a perspective view of the knotting mechanism in operation, Figs. 19, 20 and 21 are perspective views illustrating progressively the knot tying and twine severing operations, Fig. 22 is a view like Fig. 6 but showing the parts thereof in the initial position, Fig. 23 is a view diagrammatically illustrating the cycle of operations of the machine.

Referring now specifically to the accompanying drawings, wherein I have illustrated an embodiment of my invention, 10 indicates the frame of the machine supported by legs 12 on a base 14, the frame primarily comprising front and rear panels 15 and 16 connected by a centrally disposed T-bar 18 and tie-rods 19. The parcel of meat or like product 17 to be tied is first drawn into compressed condition by a plurality of independent and parallel cables 20 and is thereafter bound in such condition by a plurality of twine strands wrapped in parallel relation around the parcel adjacent to the cables. The entire machine is operated from a single motor 22 on the base 14, all as hereinafter described.

Cable carrying mechanism

Pivoted at 24 to the outer face of each panel 15 and 16 of the frame is a pair of oppositely disposed arms 25, and two bars 26 extending substantially the length of the machine are mounted on the free ends of the arms respectively on opposite sides of the center line of the machine. Mounted on and along these bars are a series of oppositely disposed arms 28, each arm on one bar having a corresponding and oppositely disposed arm on the other bar. Mounted on the free end of each arm 28 is a roller 29 rotatable on an axis parallel to the bar 26 and a second roller 30 arranged right-angularly to the first roller. On and extending along the rear face of each bar 26 is a shaft 32 rotatably supported at its ends in brackets 33 secured to the bar. Keyed non-rotatably to and along each shaft 32 at 34 are a plurality of drums 36, and between each two drums are two sheaves 37 loose on the shaft, the two sheaves at opposite ends of each drum being connected together by tie-rods 38. Mounted on each drum is a torsion spring 40 having one end connected to the drum and the other end to an adjacent sheave. The shafts 32 are rotated at the proper time by mechanism hereinafter described.

Each pair of oppositely disposed arms 28 is adapted to cooperate with two of the said cables 20. Each of such two cables is attached to a sheave 37 and extends therefrom around a corresponding roller 30, over the adjacent roller 29, downwardly through the two aligned eyes 41 of an equalizing plate 42 and from thence upwardly and over the corresponding and oppositely disposed rollers 29 and 30, and the end portion is then wound around and attached to the sheave 37 oppositely disposed from the sheave holding the other end of the cable. Each equalizing plate 42 is pivoted at its central portion to a bar 43 carrying a weight 44 on its lower end. It will be understood that the springs 40 are under a tension tending to wind the cables onto the sheaves 37 whereby, in conjunction with the weights 44, to keep the cables taut.

The arms 25 are normally in the position of Fig. 2 in which position the cables 30 are held in laterally spaced and open parallel relation to provide a cradle for receiving the product to be compressed and tied into a parcel. This operation requires a substantial pivoting of the arms 25 upwardly and inwardly to the position of Figs. 15 and 16. Such movement of each arm 25 is effected by a cam 46, and a novel compound toggle linkage system is provided to multiply the movement of the arm relative to the radial throw of the cam whereby to give the arms the necessary movement and hold them firmly in position at the end of such movement. This linkage system comprises a lever 47 pivoted to the frame at 48 and extending outwardly therefrom. A link 49 pivoted to the arm 25 has its lower end pivoted to the inner end of a link 50. Two links 52 and 53 respectively connect the free end of the lever 47 with the intermediate portion of the link 50 and the free end of the link 50 with an intermediate portion of the lever 47, the link 52 being longer than the link 53. A link 54 pivoted to the frame at 19 has its free end pivoted to an intermediate portion of the link 50. A roller 56 carried by the lever 47 rests on the periphery of the cam 46. The arrangement is such that, upon rotation of the cam, the lever 47 is raised to the position illustrated in Figs. 4 and 15 wherein the cables have been wrapped about the greater portion of the product 17 and the links 49, 50 and 54 have been brought into straight alignment. Thus the relatively small throw given to the levers 47 has been multiplied sufficiently to move the arms 25 to their uppermost positions and the toggles formed by the links 49, 50 and 54 have straightened out to provide a firm support for holding the arms 25 in said positions. Two inwardly extending and segmental plates 58 substantially the length of and extending along the bars 26 are carried on the free ends of the arms 28 and serve in the extreme forward position of such arms to engage the product between the arms and thereby bridge the gap thereof not engaged by the cables 20. The inner portions of these plates are deflected downwardly whereby to provide operating space for the knotting mechanism. The cams 46 are rotated from the motor 22, as hereinafter described, and springs 59 may be provided for assisting in drawing the levers 47 downwardly.

Twine carrying and wrapping mechanism

Rotatably carried on a stud 60 extending inwardly from each frame panel 15 and 16 is a pair of pinions 62 having hub portions carrying a pair of arms 63. The pinions are adapted to be rotated in opposite directions by a pair of racks 67 engaging the pinions respectively on opposite sides thereof, the racks being connected to the free ends of a pair of levers 64 pivoted to the frame at 65. Rollers 66 on the levers rest on cams 68 which cams serve to reciprocate the racks and rotate the pinions in opposite directions.

Two bars 69, respectively at opposite sides of the center line of the machine and extending substantially the length of the machine, have brackets 70 on the ends thereof pivotally connected to the free ends of the arms 63 at 72. Also mounted on the inner face of each frame panel 15 and 16 are two members 73 having cam tracks 74 and 75 respectively. Rollers 76 carried on the ends of the bars 69 ride in and are guided by these tracks. Fingers 78 and 79 carried respectively by the bars extend inwardly toward each other (Figs. 9 and 10). Along one side of the machine are mounted a plurality of twine cones 80 and the fingers 78 are adapted to receive and guide the twine strands 77 therefrom, each finger 78 being provided with eyes 81, 82, 83 and 84 for this purpose. Each twine strand extends from the cone through the eyes 81, 82, and 83, and from thence downwardly and in reverse direction through the eye 84, the free end portion of each strand hanging freely beyond the eye 84.

The free end of each finger 79 is bifurcated and the upper furcation thereof has pivotally mounted thereon a twine clamping lever 86 cooperating with the end of the finger whereby to provide clamping jaws (Fig. 10) for the free end of the twine. A spring 88 normally pivots the lever in a direction closing the movable jaw onto the finger end. The long arms of the levers 86 project beyond the edge of their fingers in position to engage cam elements 90 (Figs. 12 and 13) and open the jaws as the fingers 79 return to their initial position (Fig. 9). The elements 90 are pivotally mounted on the T-bar 18 and are normally held in the upward position by springs 91. When the arms 63 are brought back to their initial position, the free end of each finger 78 passes directly over the corresponding finger 79 and drags the loose end of its twine into the open jaws thereof.

Disposed between adjacent pairs of fingers 78 and 79 are plates 92 each pivoted at 93 to a bracket 94 on the T-bar 18, a spring 95 normally holding each plate upwardly to the position illustrated in Fig. 9. When a product to be tied is placed in the cradle formed by the cables 20, it depresses the plates 92 upon which it rests. Each of such plates carries a pivoted hook 96 (Fig. 3) normally held in retracted position by a spring 98 but adapted to be pivoted forwardly by a cam 99 on the T-bar 18 when the plate 92 is depressed. Upon such downward movement in its forward position, the hook passes closely adjacent to the free end of the finger 79 and serves to push any possibly curved or displaced end of twine into position between the said open jaws. Adjacent to the end of their downward movement, the plates 92 engage pins 91' on the elements 90 and depress the elements to a position freeing the levers 86 which thereupon snap closed upon the twine ends (Fig. 12).

The cams 68 are arranged first to give the fingers 78 a slight movement from the position of Fig. 9 to that of Fig. 13 and thereafter to move the fingers 79. As the arms 63 carrying the fingers 79 move upwardly, (Fig. 13) the cam track 75 so guides the bar 69 that the fingers 79 pass closely around the cables 20 which have been wrapped around the product 17 to be tied, thereby wrapping the free end portion of the twine around a substantial portion of the product. Thereafter, the other arms 63 are also moved upwardly and the cam track 74 guides the fingers 78 around the opposite side of the product closely adjacent to the cables 20 (Fig. 15). When the arms have reached the position of Fig. 16 the twine strands have been wrapped entirely around the product, it being noted that a twine strand is provided between each pair of cables 20 (Fig. 1). It will also be noted that the jaws 86 close only on those twine ends over which the product extends and therefore the twine strands are wrapped only about that portion of the cradle containing the product. It will also be understood that the friction of the twine within the eyes 81—84 is sufficient to cause the twine to wrapped closely onto the product.

Knot tying mechanism

The knotting mechanism for joining the ends of the twine strands extending around the product is carried primarily on one of the bars 26. A plate 100 is mounted to slide longitudinally on brackets 101 on and extending forwardly from the fingers 28 carried by this bar 26, and at the same time to have a lateral movement due to a plurality of angularly arranged slots 103 through which extend holding studs 105 threaded into the brackets 101. On the forward edge of the plate are mounted a plurality of U-shaped elements 107 the bottom end of each of which provides a fixed twine holding jaw 109. Cooperating with each such jaw is a movable jaw 111 mounted on the lower end of a vertical shaft 113 to the top end of which is fixed an arm 115, the shaft being rotatably mounted within the element 107. Springs 117 connected to the arms 115 normally hold the movable jaw closed onto the fixed jaw. It will be understood that there is one pair of jaws 109—111 for each pair of fingers 78—79.

In their initial position (Fig. 9), the fingers 78 and 79 are located one above the other in a vertical plane. At the extremity of their forward movement (Fig. 16), the fingers 78 and 79 are located in relatively lateral and overlapping positions horizontally. This latter position is accomplished by cam surfaces 119 and 121 on the inner faces of the members 73 which surfaces crowd the fingers 78 laterally as the fingers approach their uppermost position. As each finger 78 passes the cooperating finger 79 (Fig. 16), the twine held by the former forms a loop beyond the twine end held vertically by the bifurcated finger 79. At this time the plate 100 is pushed forwardly by a bell crank 123, connecting link 125 and other mechanism hereinafter described, whereupon the closed jaws 109—111 are pushed through the said twine loops provided by fingers 78 (Fig. 16).

A shaft 127 mounted in brackets on the plate 100 carries a plurality of cam lugs 129 thereon respectively cooperating with the arms 115. The shaft is operated by mechanism hereinafter described and including a crank 131 through which slidably extends a square shaft 133. A member 135 and universal joints at its ends connects the shaft 133 to the shaft 127 (Fig. 8), these connections permitting lateral movement of the shaft 127. After the jaws have passed through the twine loops the shaft 127 is rotated sufficiently to open the movable jaws 111 as shown in Fig. 18. The fingers 78 thereupon retreat to the position of Fig. 17, thus forming twine loops 151 about the jaws 109—111. Each jaw 111 may be provided with a shoulder 12 for preventing the slipping of the loop therefrom.

A plurality of shafts 137, cooperating respectively with the fingers 78—79, are supported at their inner and outer ends by brackets 139 and 141 respectively mounted on the plate 58 and bar 26. A toothed rack 143, reciprocated by mechanism hereinafter described, is in mesh with pinions 145 on the outer ends of these shafts whereby to rotate the shafts. On the inner end of each shaft 137 is fixed a twine carrying member 147 having a V-notch 149 in its forward face. When the arms 28 and the fingers 79 are in their extreme forward positions (Fig. 17), each V-notch 149 is in alignment with the free end portion of the twine held by the corresponding jaws 86. The fingers 78 having retreated to the position of Fig. 17, the members 147 are rotated to engage the twine ends in the V-notches 149, pull such ends out of the jaws 86 and carry them around the loops 151 and into the jaws 109—111 (Fig. 20). The shaft 127 thereupon immediately functions to release the jaws 111 which snap closed onto the twine ends. The plate 100 is then drawn backwardly to its initial position, whereby drawing the jaws 109—111 and the twine ends through loops 151 and forming the knots (Fig. 21).

Each attached end of twine is cut off by the following mechanism. A plate 153 carried on the arms 25 beneath the plate 100 has a limited sliding movement longitudinally allowed by recesses 155 therein fitting over lugs 157 on the arms, the recesses being somewhat longer than the lugs. Depending from the plate 153 are a plurality of elements 159 having their lower ends hookshaped and providing knife edges 161. Cooperating with each such edge is a plate 163 (Figs. 10, 16, 19 and 21) fixed to the plate 58. The plate 153 is reciprocated by the plate 100 as follows. A pin 165 carried by the plate 100 extends into a recess 167 within the plate 163 (Fig. 8), the extent of the recess 167 longitudinally of the plate being slightly shorter than the longitudinal stroke of the plate 100. Thus, upon forward movement of the plate 100, the pin engages one edge of the recess 167 and shifts the plate 163 forwardly, whereby moving the elements 159 to the position of Fig. 19 and providing a gap between the two knife edges into which the twine engages under tension of the finger 78. Upon rearward movement of the plate 100 the pin 165 engages the other end wall of the recess 167 and moves the elements 159 to the position of Fig. 21, thus severing the twine.

*Power mechanism*

All the above described mechanisms are operated from the motor 22. A worm 169 on the motor shaft engages and drives a worm gear 171 loose on a shaft 173 supported at its ends in brackets 170 depending from the panels 15 and 16. A clutch element 175 splined to the shaft 173 is adapted to cooperate with clutch teeth on the gear 171 to drive the shaft. A forked arm 177 of a bell crank pivoted at 179 engages the clutch element and the other arm thereof provides a foot pedal 181, a spring 182 acting normally to hold the bell crank and clutch element in the disengaged position shown in Fig. 1. The clutch may be closed by depressing the pedal 181 which is thereupon held in the closed position of the engagement by a shoulder 183 therewith, this shoulder being on the lower end of a lever 185 pivoted at 187. The upper end 189 of the lever is in the path of movement of a pin 191 on one of the cams 46, the purpose of the pin being to automatically trip the lever and stop the machine, as hereinafter described.

A pinion 193 on the shaft 173 is in mesh with a gear 195 fixed to a pinion 197. The pinion 197 is in mesh with a gear 199 on a shaft 200. Shafts 200, 202, and two shafts 204 extend throughout the length of the machine and are mounted at their ends in the frame panels 15 and 16. The shaft 202 is driven from the shaft 200 by gears 206 and 208 respectively on shafts 200 and 202 and interconnected by two idlers 210. The two shafts 204 are driven from shafts 200 and 202 by sprocket chains 212 engaging sprocket wheels 214 on such shafts. The connections are such that the shafts 200, 202 and 204 are rotated at the same speed and rotate through one revolution for each cycle of operation of the machine.

The cams 46 which operate the compound linkage system to move the arms 25, as heretofore described, are mounted on the shafts 204, one such cam being mounted on each end of each of such shafts. The cams 68 which operate the levers 64 and racks 67 to move the arms 63 are mounted on the shafts 200 and 202. The bell crank 123 and link 125 which operate the plate 100 (Fig. 8) are driven from a cam 216 on the shaft 202 as follows. A link 218 (Fig. 2) connects the other arm of the bell crank with the free end of the lever 220 pivoted at 222. A universal joint 224 is provided at the upper end of the link 218 for permitting movement of the bell crank 123 with the arm 25 relative to the link. The lever carries a roller 226 which rides on the cam 216, the roller engaging against the cam when the arms 25 are in their uppermost position. The crank 131 and shaft 127 are driven from a cam 228 on the shaft 202 as follows. A link 230 (Fig. 2) connects the crank with the free end of a lever 232 pivoted at 222, the lever carrying a roller 234 engaging against the cam. Springs 236 and 238 are provided for normally moving the links 218 and 230 upwardly.

The rack 143 which rotates the knotting shafts 137 is reciprocated by the following mechanism. A link 240 connected to the rack at 242 (Fig. 7) has its outer end connected to one arm of a bell crank 244 pivoted at 246. The other arm of the bell crank is connected to the upper end of a link 248 through a universal joint 250. The lower end of the link 248 is connected to the free end of the lever 252 pivoted at 254. A roller 255 on the lever 252 rides in the cam path 256 of a face cam 258 which cam path is adapted to reciprocate the rack in both directions through the said connections.

The cable tightening shafts 32 are rotated from the shaft 200 through novel mechanism illustrated more particularly in Figs. 4, 5, 6 and 22. An interrupted gear 260 and a gear sector 262 fixed to the shaft 200 are adapted respectively to cooperate with an interrupted pinion 264 and a pinion 266 on a shaft 268, the pinions 264 and 266 being on opposite sides of and rigidly connected to a pinion 270. The pinion 270 is in mesh with a gear 272 in mesh with a second gear 274. The gears 272 and 274 are respectively in mesh with two pinions 276 respectively on opposite sides of the center line of the machine. The pinions 276 are fixed respectively to two sprockets 278 connected by chains 280 to sprockets 282 on the ends of the shafts 32.

The interrupted gear 260 and gear sector 262 rotate through one revolution for each cycle of operation of the machine and during such time the gear 260 rotates the shafts 32 first in the direction of the arrows (Fig. 4) to wind up the cables 28, and thereafter the sector 262 rotates such shafts in the reverse direction to bring them back to their initial position, all in synchronism with the other operations of the cycle. The parts are shown in the initial and idle position, in Fig. 22. Rotation of the elements 260 and 262 through the distance *a* has no effect upon the shafts 32. Rotation thereof through the distance *b* however rotates the shafts 32 in the direction of the arrows (Fig. 4) through the engagement of the gear teeth 284 with the teeth of the interrupted pinion 264. Adjacent to the end of such movement a large tooth 286 on the pinion 264 passes through a cooperating recess 288 in the gear 260 and thereafter rests on the peripheral portion 290 of the gear 260 during continued rotation of the latter, thus holding the pinion 264 against reverse rotation. The shafts 32 are thereby held in their wound-up position until the gear teeth 292 on the sector 262 reach the pinion 266 whereupon the sector serves to rotate the pinion 266 and shafts 32 back to their initial position, the gear 260 being cut away at 294 to provide clearance for the tooth 286. The parts thereafter stop in the initial position shown in Fig. 22.

*Cycle of operations (Fig. 23)*

The machine is shown in its initial position in Figs. 2, 9 and 22. The arms 25 are in their outermost position whereby holding the cables 20 stretched out to provide a cradle for receiving the product to be tied, the clutch 175 is in the open position, and the loose end of each twine strand 77 has been dragged by the fingers 78 into the corresponding open jaws on the fingers 79 (Fig. 10). The operator places the product, such as a piece of meat 17, within the cradle wherein it depresses the plates 92 which it engages and causes the corresponding jaws 86 to close upon the free ends of the twine strands 77. The operator then depresses the foot pedal 181 which closes the clutch 175 whereupon the shaft 173 and connected parts start rotating, the shoulder 183 of the lever 185 thereupon engaging and holding the pedal depressed. The cycle of operations, diagrammatically illustrated in Fig. 23 follows.

Rotation of the cams 46 immediately operates to pivot the arms 25 upwardly and wrap the cables 20 about the product, this movement continuing to the position illustrated in Fig. 4 wherein the product is entirely surrounded by the cables supplemented by the plates 58. After the cams 46 have rotated through approximately 10 degrees, the teeth 284 of the interrupted gear 260 engage the teeth of the interrupted pinion 264 and cause rotation of the shafts 32 in the direction of the arrows (Fig. 4), thereby winding up the cables 20 whereupon they compress the product into a compact body. It will be apparent that the springs 40 provide a resilient connection between the cables and the shafts 32 whereby to bring the cable substantially to a predetermined tension and allow for products of varying diameters, and it will also be noted that the cables continue to tighten for a considerable time after the product has been completely surrounded by the cables and plates 58.

After the shaft 200 has rotated through approximately forty degrees, the cams 68 begin raising the levers 64 to move the twine carrying fingers 78 and 79 outwardly and upwardly about the product. The cams are so constructed, however, that the fingers 78 are first moved backwardly (Fig. 11) to the position of Fig. 13 sufficiently to permit clearance for the fingers 79. The fingers 79 are then moved upwardly as indicated in Fig. 13 to give the free end portion of the twine a preliminary wrap about one side of the product. Both fingers 78 and 79 are thereafter moved to the position of Fig. 16, thus wrapping the twine entirely around the product, the cam surfaces 119 and 121 crowding the fingers 78 laterally of the fingers 79 as they approach their uppermost and overlapping relation.

With the parts in the position of Fig. 16, the cables 20 have been drawn tightly around the product 17 and the twine strands 77 have been wrapped therearound. The cam 216 now functions to shift the plate 100 forwardly (Fig. 8) whereby pushing the jaws 109—111 through the twine loops 151 provided by the fingers 78 (Fig. 16) and the fingers 78 then retreat to the position of Fig. 18. The cam 228 thereupon operates through link 230 and connected parts to open the movable jaws 111 to the position of Fig. 18. The face cam 258 then functions through the link 248 and rack 143 to rotate the shafts 137 and members 147 from the position of Fig. 18 to the position of Fig. 20, thus carrying the free end of the twine around the loop 151 and into the jaws 109—111. The cam 228 thereupon operates to close the jaws 111 upon the twine and directly thereafter the cam 216 functions to withdraw the plate 100 and the jaws 109—111 therewith, thus drawing the free end of the twine through the loop 151, as shown in Fig. 21, and thereby completing the knot. The cam 228 thereafter opens the jaws 111 to release the twine and the elements 159 act to cut off the twine upon rearward movement of the plate 100, as heretofore described.

Following the above described operations, the parts are returned to their initial positions as follows: The cam 228 closes the jaws 111. The arms 25 move to the open position of Fig. 2. The sector 262 engages the pinion 266 and rotates the shafts 32 back to their initial position, thus unwinding the cables. The fingers 78 and 79 return to initial position, the fingers 79 first coming to the position of Fig. 9 wherein the cams 90 open the twine-gripping jaws 86, and the fingers 78 thereafter passing vertically over the jaws 86 and dragging the twine ends thereinto. At the end of the cycle, the pin 191 trips the lever 185 whereupon the clutch 175 moves to the disengaged position and the machine stops.

My invention is primarily a meat tying machine and, while I have for convenience throughout the specification and claims referred thereto as a meat tying machine, it will be understood that the scope of the invention is not limited to the particular product operated upon.

Having thus described my invention, what I claim as new and desire to secure by Letters Patent of the United States, is:

1. A meat tying machine comprising a plurality of cables arranged in laterally spaced relation, means for wrapping the cables around a parcel placed in wrapping position adjacent to the cables, means for tightening the cables into compressing engagement with the parcel, means for wrapping twine around the compressed parcel and joining the twine ends while the cables hold the parcel in compressed condition, and means for causing the cable wrapping and tightening operations and the twine wrapping and joining operations to function synchronously.

2. The machine defined in claim 1 plus means for returning the cable and twine wrapping means to initial position and stopping the same in such position.

3. The machine defined in claim 1 wherein the second named means engages and tightens the cables from both ends thereof.

4. A meat tying machine comprising a plurality of independent cables arranged in laterally spaced relation, means for wrapping the cables around a parcel placed in wrapping position adjacent to the cables, means for tightening the cables into compressing engagement with the parcel, means for wrapping a plurality of independent twine strands tightly around the compressed parcel respectively adjacent to the cables and joining the twine ends while the cables hold the parcel in compressed condition, and means for causing the cable wrapping and tightening operations and the twine wrapping and joining operations to function synchronously.

5. A meat tying machine comprising a plurality of cables arranged in laterally spaced relation to provide a cradle for receiving a parcel, means for wrapping the cables around a parcel placed in the cradle and tightening the cables into compressing engagement with the parcel, means for wrapping twine around the compressed parcel and joining the twine ends while the cables hold the parcel in compressed condition, and means for causing the cable wrapping and tightening operations and the twine wrapping and joining operations to function synchronously.

6. A meat tying machine comprising a plurality of cables arranged in laterally spaced relation to provide a cradle for receiving a parcel, means for wrapping the cables from intermediate points thereof in both directions around a parcel placed in the cradle and tightening the cables from both ends thereof into compressing engagement with the parcel, means for wrapping twine around the compressed parcel and joining the twine ends while the cables hold the parcel in compressed condition, and means for causing the cable wrapping and tightening operations and the twine wrapping and joining operations to function synchronously.

7. A meat tying machine comprising a plurality of cables arranged in laterally spaced relation, a plurality of arms in laterally spaced relation respectively cooperating with the cables, means for moving the arms to carry the cables around a parcel placed in wrapping position adjacent to the cables, means for tightening the cables into compressing engagement with the parcel, means for wrapping twine around the compressed parcel and joining the twine ends while the cables hold the parcel in compressed condition, and means for causing the cable wrapping and tightening operations and the twine wrapping and joining operations to function synchronously.

8. The machine defined in claim 7 wherein said arms are mounted for pivotal movement and cooperate with the cables at points remote from the pivotal points of such movement.

9. A meat tying machine comprising a plurality of cables arranged in laterally spaced relation to provide a cradle for receiving a parcel, a plurality of pairs of arms, the two arms of each said pair engaging a cable respectively on opposite sides of the cradle, means for moving the arms to carry the cables from intermediate points thereof in both directions around a parcel placed in the cradle, means for tightening the cables to compress the parcel, cooperating means for wrapping twine around the compressed parcel and joining the twine ends while the cables hold the parcel in compressed condition, and means for causing the cable wrapping and tightening operations and the twine wrapping and joining operations to function synchronously.

10. A meat tying machine comprising a plurality of cables arranged in laterally spaced relation, means for wrapping the cables around a parcel placed in wrapping position adjacent to the cables, means for tightening the cables into compressing engagement with the parcel, means including a plurality of fingers carrying independent twine strands and movable to wrap said strands around the compressed parcel, means for joining the ends of the strands, and power driven mechanism connected to and operating the cable wrapping and tightening means and the twine wrapping and joining means.

11. The machine defined in claim 10 including a plurality of pairs of said fingers, the two fingers of each pair being adapted to engage one of said strands respectively at its end and at a point remote therefrom, and means for moving the two fingers of each pair respectively in opposite directions to wrap the strands around the compressed parcel.

12. The machine defined in claim 10 including a plurality of pairs of said fingers, a movable twine holding jaw on the end of one finger of each said pair, means for opening said movable jaws when the fingers carrying the jaws return to initial position, means for causing the other fingers to drag the twine ends into said jaws respectively, means thereafter causing said jaws to close onto the twine ends, and means for moving the two fingers of each pair respectively in opposite directions from said initial position to wrap the strands around the compressed parcel.

13. A meat tying machine comprising a plurality of cables arranged in laterally spaced relation, means for wrapping the cables around a parcel placed in wrapping position adjacent to the cables, means holding one end of each cable and resiliently resisting pull on the cables, means carrying the other ends of the cables, and power driven means cooperating with the last named means and arranged to tighten the cables into compressing engagement with the parcel.

14. A meat tying machine comprising a plurality of cables arranged in laterally spaced relation, a plurality of pairs of arms pivoted at their lower ends, drums carrying the two ends of each cable respectively on the free ends of a pair of said arms and resiliently resisting pull on the cables, means for pivoting the arms in directions wrapping the cables around a parcel placed over the cables, and means for rotating the drums in cable tightening directions when the cables are thus wrapped around the parcel.

15. A meat tying machine comprising a plurality of cables arranged in laterally spaced relation, means for wrapping the cables around a parcel placed in wrapping position adjacent to the cables, means for tightening the cables into compressing engagement with the parcel, means for wrapping twine around the compressed parcel, cooperating means carried by the first named means for joining the twine ends while the cables hold the parcel in compressed condition, and means for causing the cable wrapping and tightening and the twine wrapping and binding operations to function synchronously.

16. The machine defined in claim 15 wherein said cooperating means includes a plurality of pairs of jaws carried in alignment on a plate carried by said first named means.

17. In a meat tying machine, means for compressing a parcel, means carrying independent twine strands located in spaced relation along the first named means, and means for causing such of the second named means as are located along the parcel to wrap and tie twine strands around the parcel in compressed condition and automatically eliminate the wrapping thereonto of twine by such of the second named means as is located beyond the ends of the parcel.

18. In a meat tying machine, means for compressing a parcel, means carrying independent twine strands located in spaced relation along the first named means, jaws for gripping said twine strands, means actuated by the weight of a parcel placed within the compressing means to cause only such jaws as are located along the parcel to grip the twine strands, and means for causing the second named means to wrap and tie the gripped twine strands around the parcel in compressed condition.

19. In a meat tying machine, compressing means providing a cradle, twine carrying means including a plurality of open jaws arranged in spaced relation along the cradle, means tripped by the weight of a parcel in the cradle for causing the corresponding jaws to close on the twine strands therein, means operating the compressing means to compress the parcel, and means operating in conjunction therewith for causing the gripped twine strands to be wrapped and tied around the compressed parcel.

20. In a meat tying machine, compressing means providing a cradle, means for carrying a plurality of strands of twine arranged in spaced relation along the cradle, means operating the compressing means to compress the parcel, means operating in conjunction therewith for causing the twine carrying means to wrap a plurality of strands of twine in spaced relation around the compressed parcel, means for forming loops in the twine strands, a plurality of pairs of jaws arranged in alignment adjacent thereto, means causing the jaws to pull the twine strands through the loops respectively, and means for causing the compressing operations and the twine wrapping and knotting operations to function synchronously.

WILLIAM FLETT.